United States Patent [19]

Shern

[11] Patent Number: 4,810,151

[45] Date of Patent: Mar. 7, 1989

[54] DOOR TRANSPORTING AND MOUNTING MACHINE

[76] Inventor: R. Garland Shern, Route 7, Box 100-B, Columbia, Mo. 65202

[21] Appl. No.: 176,425

[22] Filed: Apr. 1, 1988

[51] Int. Cl.$^4$ .............................................. B66F 9/14
[52] U.S. Cl. ...................................... 414/11; 269/17; 269/905; 414/590
[58] Field of Search .................. 414/10, 11, 589, 590; 269/17, 904, 905

[56] References Cited

U.S. PATENT DOCUMENTS

| | | |
|---|---|---|
| 2,337,796 | 12/1943 | Baker et al. ............................ 414/11 |
| 2,828,870 | 4/1958 | Corley .................................... 414/11 |
| 3,305,219 | 2/1967 | Rhodes ................................... 414/11 |
| 3,306,578 | 2/1967 | Meeks et al. ...................... 414/11 X |
| 3,877,582 | 4/1975 | Moore .................................... 414/11 |
| 3,923,167 | 12/1975 | Blankenbeckler .................... 414/11 |
| 4,023,686 | 5/1977 | Papsco et al. ......................... 414/11 |
| 4,117,939 | 10/1978 | Haddock ................................ 414/11 |
| 4,180,252 | 12/1979 | Cushenbery ........................... 269/17 |

Primary Examiner—Leslie J. Paperner
Attorney, Agent, or Firm—Polster, Polster & Lucchesi

[57] ABSTRACT

A door transporting and mounting machine is disclosed for transporting an mounting a door relative to a complementary door frame. The machine includes a wheeled supporting frame for portably transporting a door to a selected door frame site. A generally vertically extending column extends upwardly from the supporting frame and includes a carriage mounted on the column for movement between lower and upper positions. Door gripping arms are pivotally mounted on the movable carriage for re-positioning the door between a horizontal transporting position and a vertical mounting position. When the machine is located at a complementary door frame, the movable carriage, with associated door gripping arms, moves the door to properly aligned position for mounting the door relative to its complementary door frame.

21 Claims, 4 Drawing Sheets

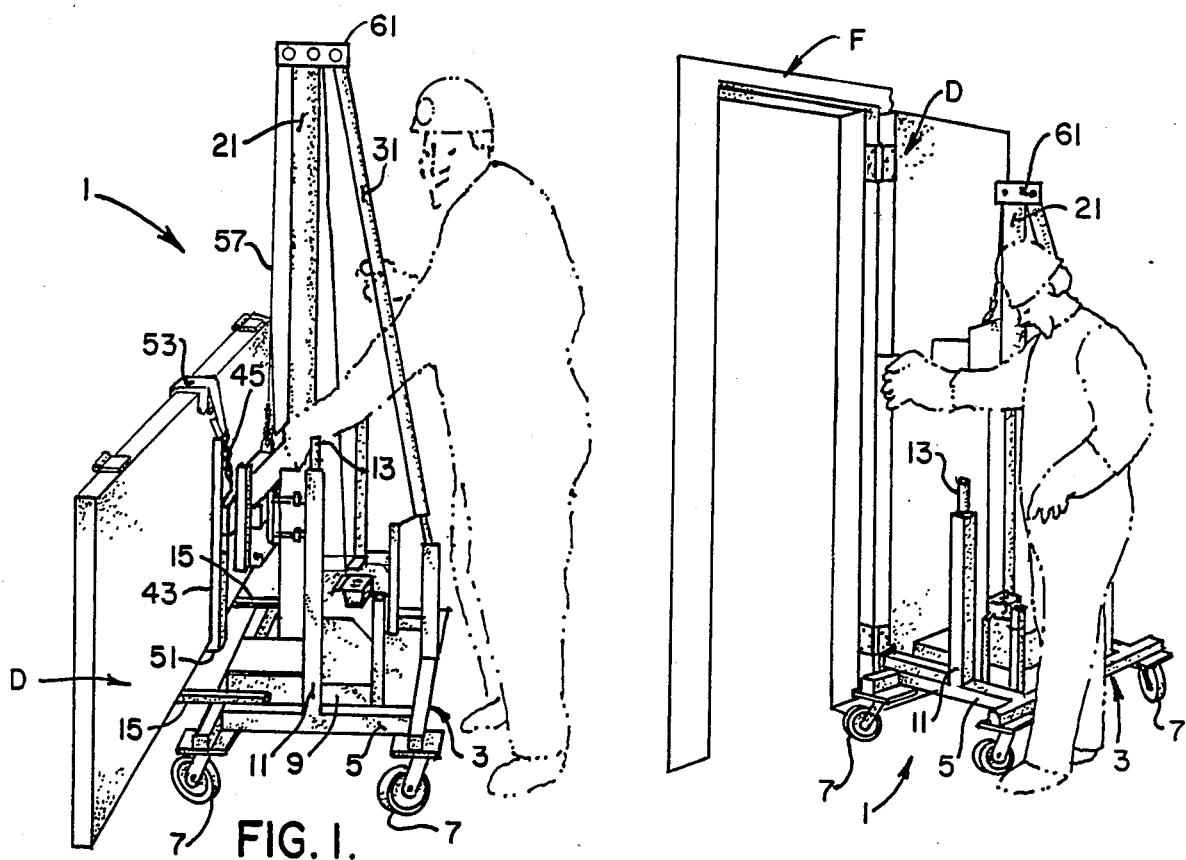
FIG. 1.
FIG. 2.
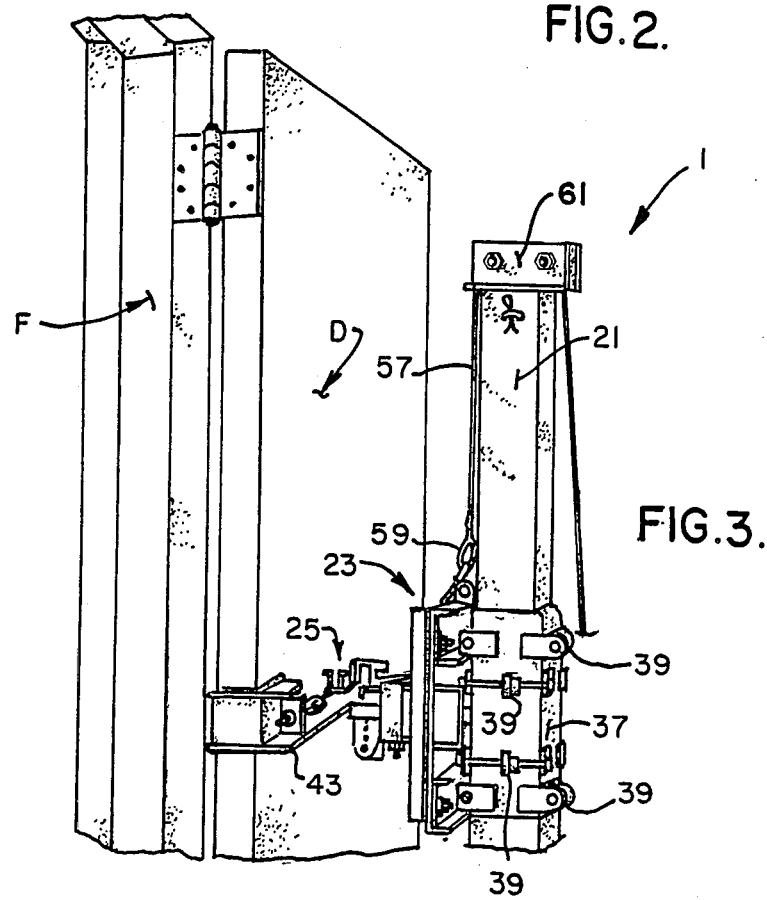
FIG. 3.

DOOR TRANSPORTING AND MOUNTING MACHINE

BACKGROUND OF THE INVENTION

The present invention relates to a door transporting and mounting machine, and more particularly, to a machine which is not only capable of transporting a door to a desired complementary door frame location, but which is also capable of properly aligning a door relative to its complementary door frame for mounting thereto.

In the building and construction industry, it is well known that a door must be properly aligned and mounted relative to a surrounding door frame, in order to provide free and uninhibited pivoting movement thereof. This door mounting procedure is commonly and generically referred to as "hanging" a door in a complementary door frame that has previously been "set" in a wall structure. Any mis-alignment of the door and door frame can create binding of cooperating hinge elements and associated hinge pins which mount the door and door frame to each other. For this reason, skilled personnel are most often used in mounting or "hanging" doors relative to door frames. While carpenters are generally thought to be the most skilled in properly aligning and mounting doors within complementary door frames, in certain instances, skilled iron-workers have also been utilized in the same capacity. Regardless of the type of tradesmen involved, doors must be correctly set and mounted or "hung" in their complementary door frames for the proper operation of the doors.

Prior to mounting in a door frame a door must be carried or wheeled to the desired site and then lifted in position to allow the cooperating hinges on the door and door frame to be assembled together. In the typical door mounting assembly, three spaced and cooperating interlocking hinges and associated hinge pins are used for mounting a door relative to a door frame.

Where the door is made of wood or pressed wood fibers, for example, it is relatively light weight and thus can be easily lifted as it is mounted or "hung" within a door frame. Yet, even light weight doors are bulky and cumbersome to handle. The weight and bulkiness of doors is substantially magnified where doors are made of metal, such as heavy metal doors used in commercial installations and in the construction of prisons. It is quite apparent that some lifting and supporting mechanism must be used to position and assist in the mounting of such heavy doors relative to a complementary door frame. Such mechanisms have included hand operated and powered lift trucks and the like. However, even with such mechanisms, it has been difficult to properly align such heavy doors in order that they can be correctly mounted or "hung" in a door frame. Further, the transportation of the doors and the subsequent lifting of the doors for door frame mounting has required several independent and time consuming steps, without assuring proper door alignment for the correct mounting or "hanging" of doors.

SUMMARY OF THE INVENTION

Among the several objects and features of the present invention may be noted:

The provision of a door transporting and mounting machine which facilitates transporting of a door to a complementary door frame site, as well as subsequent mounting of the door to its complementary door frame;

The provision of such a door transporting and mounting machine which securely grips and holds a door both for transporting to a work site, as well as mounting to a door frame, without changing the manner in which the door is gripped and supported by the machine;

The provision of such a door transporting and mounting machine which allows a door to be gripped and carried in a horizontal transporting position and then re-positioned in a vertical mounting position for assembly to a complementary door frame;

The provision of such a door transporting and mounting machine which affords adjustable positioning of a door carried by the machine to provide proper alignment and mounting of a door relative to a complementary door frame;

The provision of such a door transporting and mounting machine which also accommodates different door sizes and door weights;

The provision of such a door transporting and mounting machine which includes a self-contained motor, battery and battery re-charger to facilitate mobile use during the day and battery re-charging at night;

The provision of such a door transporting and mounting machine which further includes a detachable door frame lifting mechanism to also facilitate mounting of door frames, as well as doors; and The provision of such a door transporting and mounting machine which is portable, versatile, self-contained, easy-to-operate, ready-to-use, easy-to-separate for shipment and is otherwise an efficient machine which has been specially developed to overcome all of the aforenoted deficiencies and problems associated with the transporting and mounting of doors relative to door frames.

Briefly stated, a door transporting and mounted machine of the present invention includes a wheeled supporting frame for transporting the door to a selected complementary door frame site. A generally vertically extending column is attached to the frame and extends upwardly therefrom. A carriage is mounted on the column for movement in a generally vertical path between lower and upper positions. Door gripping arms are provided for gripping a door along side edges thereof. The door gripping arms are pivotally mounted to the carriage for re-positioning the door between a horizontal transporting position and a vertical mounting position. The carriage is moved in the vertical path by means which raise and lower the carriage along the column to assist in mounting a door relative to a complementary door frame.

In addition to the above, means are also provided for adjustably positioning the column in a generally perpendicular relationship to a supporting floor surface adjacent the complementary door frame for properly aligning and mounting the door relative to the door frame.

Other features and advantages of the present invention will become apparent from the description that is to follow.

BRIEF DESCRIPTION OF THE DRAWINGS

FIG. 1 is a perspective view of the door transporting and mounting machine constructed in accordance with the teachings of the present invention, and showing a door loaded to the machine in a horizontal transporting position;

FIG. 2 is a perspective view illustrating the door transporting and mounting machine of the present invention with a door re-positioned in a vertical mounting position for mounting or "hanging" a door relative to a complementary door frame;

FIG. 3 is a fragmentary perspective view illustrating the movable carriage and door gripping arms of the door transporting and mounting machine of the present invention;

Corresponding reference characters are used throughout the several figures of the drawings.

BRIEF DESCRIPTION OF THE PREFERRED EMBODIMENT

Figure 4:
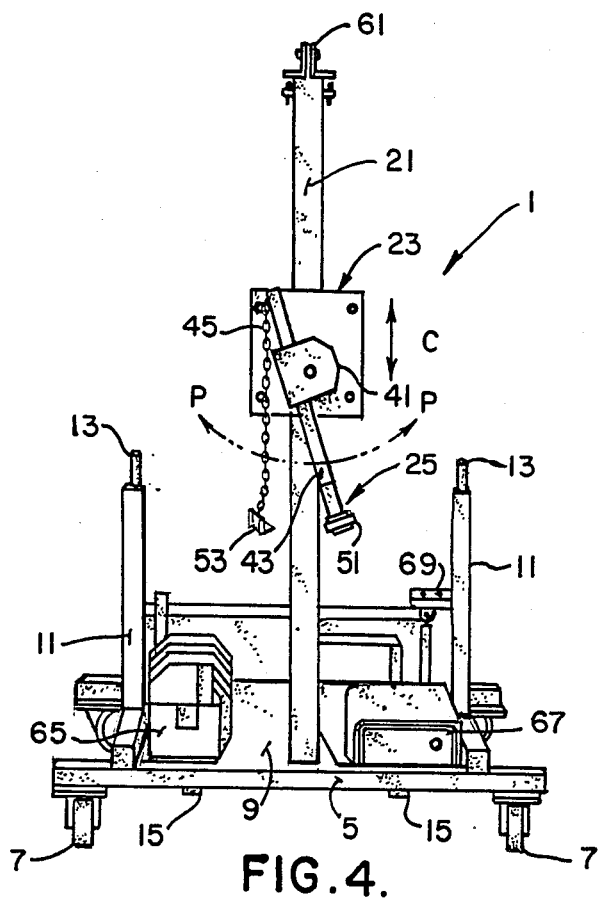
FIG. 4 is a front elevational view illustrating the components of the door transporting and mounting machine of the present invention.

The door transporting and mounting machine 1 shown in the drawings includes a wheeled supporting frame 3 having a rectangular-shaped base frame 5 with depending wheels 7 extending downwardly from each of the corners of the rectangular-shaped base frame 5. The rectangular-shaped base frame 5 is constructed from metal square tubing and has an inner horizontal supporting surface 9 within the rectangular-shaped base frame 5 for supporting components, as will be described below.

As best seen in FIGS. 1–2 and 4, welded square-tube metal sections 11 extend upwardly from the rectangular-shaped base frame 5 and terminate at upper ends in hand grips 13 for moving the door transporting and mounting machine 1, as shown by the phantom representation of the worker in FIG. 1 of the drawings.

Figure 9:
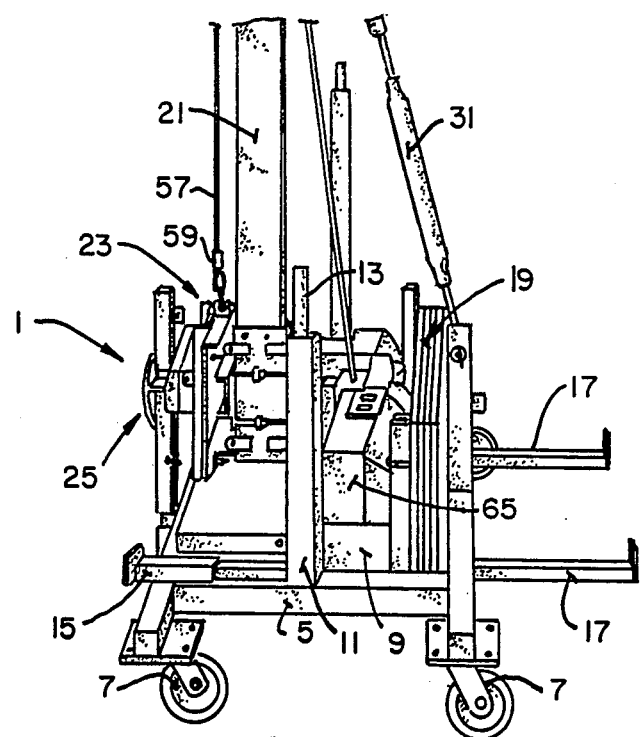
FIG. 9 is a side fragmentary perspective view illustrating the use of a pair of generally horizontally extendable members for receiving a counterbalance stored on the frame to offset the weight of a door supported by the door transporting and mounting machine.

At the front end of the door transporting and mounting machine 1, a pair of shaped generally horizontally extendable supporting members 15, 15 are capable of being extended for underlying a door D, when located in a horizontal transporting position as illustrated in FIG. 1. At the rear of the door transporting and mounting machine 1, there is second pair of spaced generally horizontally extendable supporting members 17, 17, as best seen in FIG. 9 of the drawings, which extend from the rectangularly-shaped base frame 5 in a direction generally opposite the first pair of spaced and generally horizontally extending supporting members 15, 15. The second pair of horizontally extendable supporting members 17, 17, as shown in FIG. 3, are adapted to receive counterbalance elements 19 stored along the horizontal supporting surface 9 of the wheeled supporting frame 3, in order to offset the weight of a door D supported, in part, by the first pair of horizontally extendable supporting members 15, 15.

In order to grip and support a door D on the door transporting and mounting machine 1, a generally vertically extending column 21 is attached to the wheeled supporting frame 3 and includes a roller carriage 23 mounted on the column 21 for movement in a generally vertical path between lower and upper positions. Pivotally attached to the moving roller carriage 23 are door gripping arms generally identified at 25 which are designed to grip a door D along side edges thereof in order to enable re-positioning the door between a horizontal transporting position, as shown in FIG. 1, and a vertical mounting position, as shown in FIG. 2 of the drawings.

Figure 5:
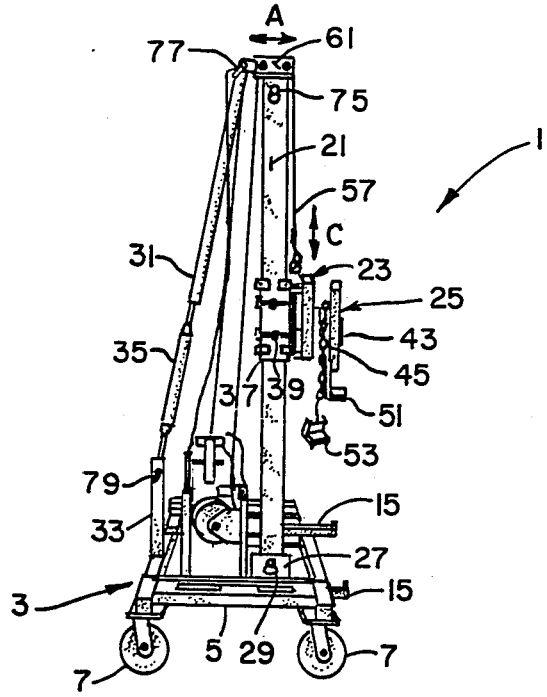
FIG. 5 is a side elevational view further illustrating the components of the door transporting and mounting machine of the present invention.

As best seen in FIG. 5 of the drawings, the generally vertically extending column 21 is pivotally attached to the horizontal supporting surface 9 of the wheeled supporting frame 3 through the upstanding flanges 27, which have openings corresponding to an opening formed in the column 21, in order to receive a releasable locking pin 29 which serves as the pivot mount for the generally vertically extending column 21. For reasons which will become more apparent hereinafter, the vertical column 21 is capable of being moved about the pivot mount 29 in opposite directions as indicated by the oppositely pointed arrow A in FIG. 5 of the drawings, in order to adjust the column 21 in generally perpendicular relationship to a supporting floor surface in the vicinity of a door frame F as shown in FIGS. 2–3 of the drawings.

For Adjusting the column 21 about the pivot mount 29, an adjustable rod 31 is connected between an upper end of the column 21 and a vertical extension 33 which extends upwardly from the rectangular-shaped base frame 5, to be angularly offset thus allowing the adjustable rod 23 to be angularly offset relative to the generally vertically extending column 21. The adjustable rod 31 includes an interconnected screw jack 35 enabling threadable adjusting of the adjustable rod 31 between the column 21 and the vertical extension 33, in order to move the vertical column about the pivot mount 29 in either of the two opposite directions as represented by the oppositely pointed arrow A in FIG. 5 of the drawings. It will also be appreciated that the essentially triangular-shaped interconnection of the vertical column 21 and adjustable rod 31 relative to the wheeled supporting frame 3 provides a rigid and stable supporting structure for the vertical column 21 in transporting and mounting a door D, throughout various positions.

The roller carriage 23 is mounted on the column 21 for movement in a generally vertical path between lower and upper positions and includes a complementary shaped circumferentially extending body 37 which corresponds in shape to the square tube configuration of the vertical column 21. Circumferentially and longitudinally spaced roller elements 39 are mounted in each of the walls of the carriage body 37 in order to enable the roller carriage 23 to be moved in the vertical path along the vertical column 21, without binding.

Figures 7, 8:
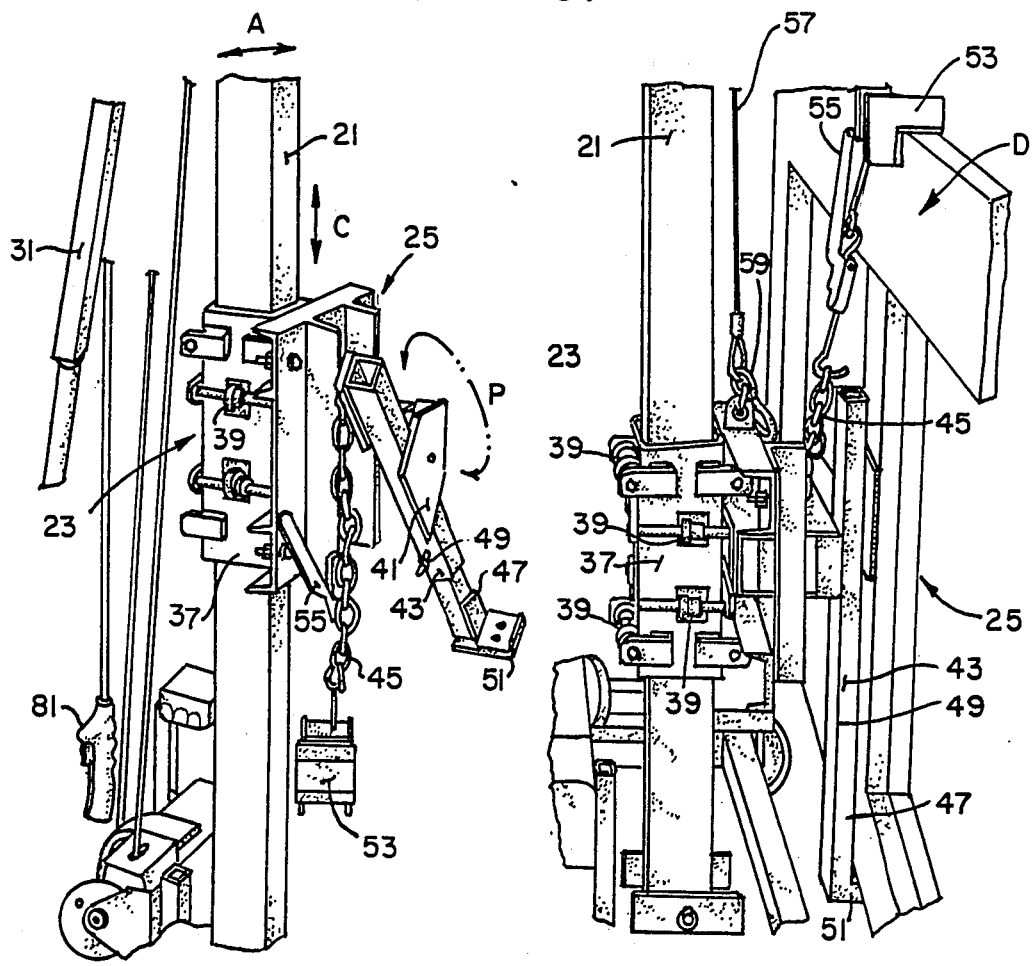
FIG. 7 is a fragmentary perspective view illustrating specifically the rigid and flexible door gripping and supporting arms associated with the movable carriage in the door transporting and mounting machine of the present invention.
FIG. 8 is also a fragmentary perspective view illustrating the manner in which the rigid and flexible door supporting and gripping arms are assembled to and grip a door relative to the door transporting and mounting machine of the present invention.

The door gripping arms, generally identified at 25 for gripping the door D along side edges thereof, are pivotally mounted to the roller carriage 23. Specifically, as best seen in FIGS. 4 and 7, a central section 41 of the door gripping arms 25 is pivotally mounted to the roller carriage 23 through a connecting shaft (not shown). Thus, the door gripping arms 25 may pivotally move the door D from its horizontal transporting position shown in FIG. 1 to its vertical mounting position as shown in FIG. 2 by simply rotating or pivoting the door gripping arms 25 relative to the roller carriage 23. This movement is represented by the oppositely pointed arrow P in FIGS. 4 and 7.

It has been found desirable to make the door gripping arms 25 with a rigid door gripping and supporting arm 43 and a flexible door gripping and supporting arm 45. As best seen in FIGS. 7-8 of the drawings, the rigid door gripping and supporting arm 43 has a square-tube construction which extends through the central pivoting panel section 41, and is further provided with a telescoping and extendable leg portion 47 which may be adjustably extended by inserting the adjusting pin 49 in various complementary openings in the mating tubular sections of the rigid supporting arm 43, as is well known. At the free end of the rigid gripping and supporting arm 43, there is also provided a channel section 51 which is generally complementary configured relative to adjacent and outer side edges of a door D for receiving and engaging same.

The flexible door gripping and supporting arm 45 is preferable constructed from chain links or the like, as illustrated in the drawings, and is attached to the rigid gripping and supporting arm 43 at an end opposite from the channel section 51, as best seen in FIGS. 4 and 7. The free end of the so-called flexible gripping and supporting arm 45 also has a channel section 53 which is of the same construction and shape as the channel section 51 of the rigid arm 43.

The term "flexible" as used above includes any construction which gives the gripping and supporting arm 45 the ability to collapse when not in use, but is capable of forming a cooperating gripping and supporting arrangement with the gripping and supporting arm 43 when mounted to a door D. Also, the present invention contemplates the possiblilty of using one or more rigid and/or flexible gripping and supporting arms, as long as the door D is gripped and supported by the arms in a stable and secure position, for use in the door transporting and mounting machine 1.

When mounted to a door D, as shown in FIG. 8 of the drawings, the opposite channel sections 51, 53 of the rigid and flexible door gripping and supporting arms 43, 45 respectively grip the door D along opposite side edges thereof. In order to assure suitable gripping and engagement of the door D by the channel-shaped sections 51, 53, the flexible gripping and supporting arm 45 includes a "boomer" or chain tightening element 55 which imparts a tightening force to place the chain links of the flexible arm 45 under tension. In this way, the rigid and flexible door gripping and supporting arms 43, 45 respectively securely grip and support a door D, in order to permit movement of the door D between a horizontal and vertical position as shown in FIGS. 1 and 2 of the drawings, without any intermediate mounting, orienting or re-positioning steps.

When it is desired to use the door transporting and mounting machine 1, a door D is gripped by the rigid and flexible door gripping and supporting arms 43, 45 as just previously described. The workmen may then grasp one or both of the handle grips 13 to move the door transporting and mounting machine 1 through the wheels 7 to the desired door mounting location. It will be noted that the door, when in a horizontal transporting position as shown in FIG. 1 of the drawings, enables the workman to easily see where he is moving the door.

Since the door D may be located in close proximity to the supporting floor surface, it may be necessary to raise the carriage 23 in order to allow the door D to be pivoted or rotated on the carriage 23 as described above. In order to raise and lower the roller carriage 23, a cable 57 has one end 59 attached to an upper end of the roller carriage 23, as best seen in FIGS. 3 and 8 of the drawings. The cable 57 extends upwardly along the column 21 and is then entrained over a pair of spaced pulleys (not shown) mounted at the front and rear of an upper end of the column 21. The spaced pulleys (not shown) are carried within the pulley mounting section 61 at the upper end of the column 21. These pair of spaced pulleys (not shown) at the front and rear of the vertical column 21, enables the cable 57 to extend in a general vertical direction along the column 21 as will be understood.

Figure 6:
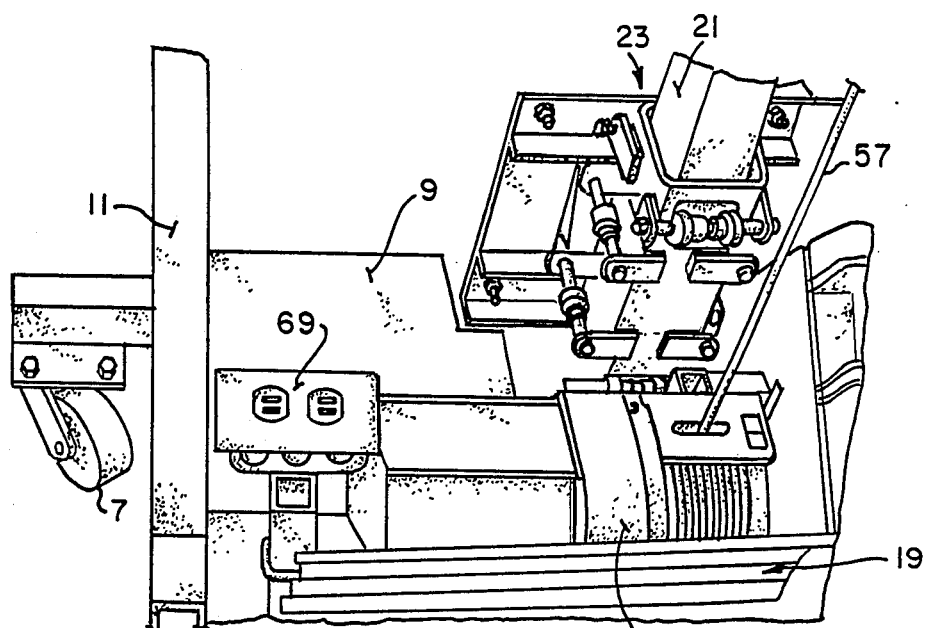
FIG. 6 is a fragmentary top perspective view illustrating the movable carriage and cable winching drum associated with the door transporting and mounting machine of the present invention.
Figure 10:
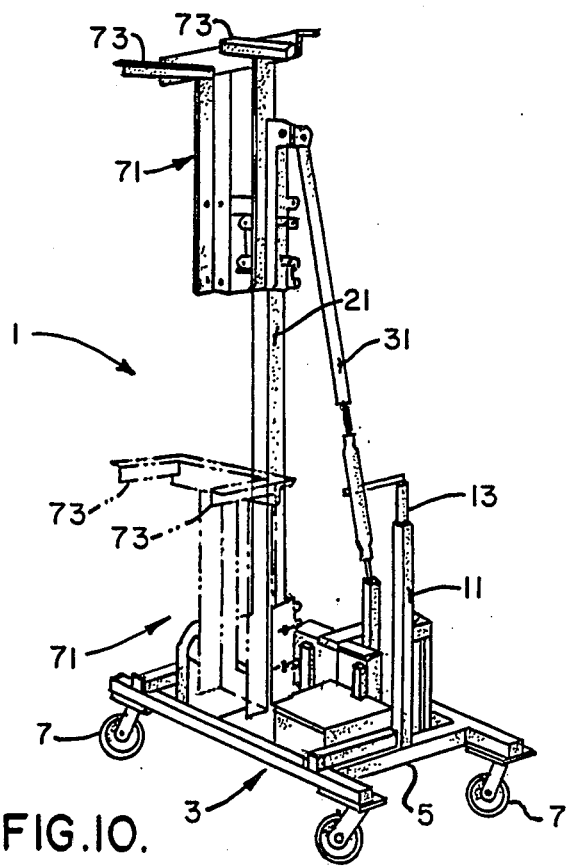
FIG. 10 is a perspective view, partially in phantom, illustrating the use of a detachable door frame lifting member which is capable of being attached to the movable carriage of the door transporting and mounting machine.

The cable 57 then extends downwardly from the upper end of the column 21, allowing the remaining part of the cable 57 to be wound about a cable winching drum 63 mounted on the horizontal supporting surface 9 of the wheel supporting frame 3, as best shown in FIG. 6 of the drawings. The cable winching drum 63 is powered by a reversible motor which winds and unwinds the cable 57 about the cable winching drum 63 for raising and lowering the roller carriage 23, to the position desired. The reversible motor of the cable winching drum 63 is energized by self-contained battery 65 with the battery 65 being recharged by a self-contained battery recharger 67, all of the above carried and supported by the horizontal supporting surface 9 of the wheeled supporting frame 3, as best shown in FIG. 4 of the drawings. A fully charged battery 65 will enable the cable winching drum 63 to raise and lower the roller carriage 23 to the desired position for daytime operations, and at night, the battery charger 67 may then be utilized to recharge the battery 65. For this latter purpose, an outlet 69 is also mounted on the wheeled supporting frame 3 in order to enable an electrical cord (not shown) to electrically interconnect the battery charger 67 to a suitable outside power source.

Where it is desired to mount a door frame relative to a particular wall, a detachable door frame lifting member 71, as shown in FIG. 10, may be detachably mounted to the roller carriage 23 for lifting a door frame by way of the spaced extending prongs 73 from the lower phantom position to the upper full line position shown in FIG. 10 of the drawings. Following installation of the door frame, the detachable door frame lifting members 71 may be removed from the roller carriage 23 allowing the door gripping arms 25 to be re-attached to the roller carriage 23 for use as described above.

The door transporting and mounting machine may be easily broken down to facilitate shipment. As best seen in FIG. 5 of the drawings, the vertical column 21 may be separated from the wheeled supporting frame 3 by removing the detachable pivot pin 29. At the upper end of the column 21, another detachable pin 75 may be removed to detach the pulley mounting section 61 from the vertical column 21. Similarly, by removing the cotter pins 77, 79 at the upper and lower ends of the adjustable rod 31, the adjustable rod 31 can be detached from the wheeled supporting frame 3 and the vertical column 21. Thus, the door transport and mounting machine 1 can easily be broken down and collapsed for shipping purposes, as may be desired.

In operation of the door transporting and mounting machine 1, a door is attached to the machine by way of the rigid and flexible door gripping and supporting arms 43, 45. Each of the channel sections 51, 53 of rigid and flexible supporting arms 43, 45 respectively grip opposite side edges of the door, with the chain boomer 55 being utilized to tighten the flexible supporting arm 45 and thereby secure the rigid and flexible doors and gripping and supporting arms 43, 45 to the door D, as previously discussed. For horizontally transporting the door D, the horizontally extendable legs 15, 15 mounted on the wheel supporting frame 3 may be extended to underlie the door D, as best seen in FIG. 1 of the drawings. The operator may then move the door transporting and mounting machine 1 by grasping the hand grips 13 and manually positioning the door transporting and mounting machine 1 to the desired door frame location, as represented by FIG. 2 of the drawings. At this location, the horizontally extendable legs 15 may be retracted, and the rigid and flexible door gripping and supporting arms 43, 45 may respectively then be pivoted on the roller carriage 23, as represented by the oppositely pointed arrow P shown in FIGS. 4 and 7 of the drawings. Because the door D may be located in close proximity to a supporting floor surface during the horizontal transporting position, it may be necessary to raise the carriage 23, as represented by the oppositely pointed arrow C also shown in FIGS. 4 and 7 of the drawings. For this purpose, a hand operated control 81, as seen in FIG. 7, may be used to activate the cable winching drum 63 for winding the cable 57 to raise the roller carriage 23 to the desired position. Should it also be necessary to transversely align the column 21 relative to a supporting floor surface in the area surrounding the frame F in order to assure proper alignment and mounting or "hanging" of the door D relative to the door frame F, the column 21 may be moved in either of two directions about the pivot 29, as represented by the oppositely pointed arrow A in FIGS. 5 and 7 of the drawings. about the pivot 29. The column 21 can thus be adjusted in generally perpendicular relationship to a supporting floor surface in the vicinity of the door frame F, in order that the door D can be properly mounted or "hung" relative to the door frame F. Following the mounting of the door D to its complementary door frame F, the rigid and flexible door gripping and supporting arms 43, 45 respectively are released from the door D and the door transporting and mounting machine 1 is now available for use in other locations.

From the foregoing, it will be seen that the door transporting and mounting machine of the present invention is a portable, versatile and self-contained unit which is easy to operate, and yet is easily broken down for shipment, when desired. The door transporting and mounting machine enables heavy and/or bulky doors to be mounted to the machine, transported in a horizontal transporting position to a desired location, and then swung to vertical mounting position, without any other adjustment of the door D relative to the door transporting and mounting machine. The efficiency of the machine, together with its adaptability and ability to accommodate a wide range of door weights and sizes, facilitates and enhances the skills of tradesmen who are responsible for properly mounting or "hanging" doors in door frames in construction settings.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

I claim:

1. A door transporting and mounting machine comprising:
   a wheeled supporting frame;
   a generally vertically extending column attached to said frame and extending upwardly therefrom;
   generally horizontally extendable supporting members on opposite sides of said column for underlying and supporting a door in a horizontal transporting position;
   a carriage mounted on said column for movement in a generally vertical path between lower and upper positions;
   door gripping means for gripping and supporting a door, said door gripping means being pivotally mounted to said carriage for re-positioning the door between a horizontal transporting position and a vertical mounting position; and
   means for raising and lowering said carriage along said column to assist in mounting the door relative to a door frame.

2. The machine as defined in claim 1 including orienting means for positioning the door in a generally perpendicular relationship to a supporting floor surface in the vicinity of the door frame.

3. The machine as defined in claim 2 wherein said orienting means includes column adjustment means for adjusting said column in generally perpendicular relationship to the supporting floor surface.

4. The machine as defined in claim 3 wherein said column adjustment means includes a pivot mount for said column relative to said wheeled supporting frame, and means for moving said column about its pivotal mount to position said column in said aforesaid generally perpendicular relationship;

5. The machine as defined in claim 4 wherein said means for moving said column about said pivot mount includes an adjustable rod connected between the frame and the upper end of said column.

6. The machine as defined in claim 5 wherein said adjustable rod is connected to said frame by a vertical extension attached to said frame in order to angularly offset said adjustable rod relative to said generally vertically extending column.

7. The machine as defined in claim 6 wherein said adjustable rod includes an interconnected screw jack for threadably adjusting said adjustable rod between said column and frame.

8. The machine as defined in claim 1 wherein said carriage comprises a roller carriage mounted on said column for movement in said generally vertical path.

9. The machine as defined in claim 8 wherein said roller carriage comprises a complementary shaped, circumferentially extending carriage which surrounds said column and includes circumferentially spaced roller elements enabling movement of said carriage in said generally vertical path.

10. The machine as defined in claim 1 wherein said door gripping means include at least one rigid door supporting and gripping arm.

11. The machine as defined in claim 10 wherein said door gripping means include one rigid door supporting and gripping arm and one flexible door supporting and gripping arm.

12. The machine as defined in claim 11 wherein said rigid door supporting and gripping arm is pivotally mounted to said carriage and said flexible door supporting and gripping arm is attached to said rigid door supporting and gripping arm.

13. The machine as defined in claim 12 wherein said rigid door supporting and gripping arm includes adjustment means for adjusting the length thereof.

14. The machine as defined in claim 13 wherein said flexible door supporting and gripping arm includes means for adjustably imparting a tightening force thereto when mounted to said door.

15. The machine as defined in claim 11 wherein opposite free ends of said rigid and flexible supporting and gripping arms include channel elements for receiving and engaging a door along and adjacent opposite side edges thereof.

16. The machine as defined in claim 1 and including a second pair of generally horizontally extendable supporting members which extend from said frame in an opposite direction to said first pair of generally horizontally extendable supporting members for receiving a counterbalance stored on said frame to offset the weight of a door supported in part by said first pair of horizontally extendably supporting members.

17. The machine as defined in claim 1 wherein said means for raising and lowering said carriage comprises a cable having one end attached to said carriage, said cable then being entrained over pulleys at an upper end of said column and finally being wound about a cable winching drum.

18. The machine as defined in claim 17 wherein said cable winching drum is powered by a reversible motor which winds and unwinds said cable about said cable winching drum for raising and lowering said carriage.

19. The machine as defined in claim 18 wherein said reversible motor is energized by a self-contained battery carried by said frame, said battery being re-charged by a self-contained battery charger also carried by said frame.

20. The machine as defined in claim 1 and further including a detachable door frame lifting member which is capable of being attached to said carriage for lifting and positioning a door frame in a desired position.

21. A door transporting and mounting machine comprising:
a wheeled supporting frame;
a generally vertically extending column attached to said frame and extending upwardly therefrom;
generally horizontally extendable supporting members on opposite sides of said column for underlying and supporting a door in a horizontal transporting position;
a carriage mounted on said column for movement in a generally vertical path between lower and upper positions;
door gripping means for gripping and supporting a door said door gripping means being pivotally mounted to said carriage for re-positioning the door between a horizontal transporting position and a vertical mounting position;
means for raising and lowering said carriage along said column to assist in mounting the door relative to a door frame; and
means for adjustably positioning said column in generally perpendicular relationship to a supporting floor surface adjacent said door frame for properly aligning and mounting said door relative to said door frame.

* * * * *